(12) United States Patent
Davis (10) Patent No.: US 7,219,851 B2
(45) Date of Patent: May 22, 2007

(54) TAPE PATH ROLLER GUIDE AND METHOD FOR MAKING

(75) Inventor: David Michael Davis, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 149 days.

(21) Appl. No.: 11/090,606

(22) Filed: Mar. 28, 2005

(65) Prior Publication Data

US 2005/0161553 A1    Jul. 28, 2005

Related U.S. Application Data

(63) Continuation of application No. 10/422,186, filed on Apr. 23, 2003, now Pat. No. 6,938,851.

(51) Int. Cl.
    *G03B 23/02* (2006.01)
(52) U.S. Cl. .................. 242/346.2; 242/615.2
(58) Field of Classification Search ............ 242/615.2, 242/615.3, 615.4, 346, 346.2, 397, 566, 548; 226/189, 193; 360/132
    See application file for complete search history.

(56) References Cited

U.S. PATENT DOCUMENTS

| | | | |
|---|---|---|---|
| 3,534,893 A | 10/1970 | Maxson | 242/615.4 |
| 4,150,773 A | 4/1979 | Fell et al. | 242/615.4 |
| 4,389,010 A | 6/1983 | Oishi et al. | 242/615.4 |
| 4,390,119 A | 6/1983 | Smetana et al. | 226/196 |
| 4,427,166 A | 1/1984 | Oishi et al. | 242/615.4 |
| 4,466,582 A | 8/1984 | Shiba | 242/615.4 |
| 4,491,891 A | 1/1985 | Shiba | 242/615.4 |
| 4,793,570 A | 12/1988 | Gelaradi et al. | 242/199 |
| 4,819,890 A | 4/1989 | Caroll | 242/615.4 |
| 4,991,275 A | 2/1991 | Adams, Sr. | |
| 5,034,839 A | 7/1991 | Okamura et al. | 360/132 |
| 5,188,272 A | 2/1993 | Kanbe et al. | 242/615.2 |
| 5,398,858 A | 3/1995 | Dugan et al. | |
| 5,409,174 A | 4/1995 | Doninelli | 242/615.4 |
| 5,657,937 A | 8/1997 | Todd et al. | |
| 5,755,392 A | 5/1998 | Badour et al. | 242/342 |
| 6,353,514 B1 | 3/2002 | Rambosek et al. | 360/132 |
| 2003/0087738 A1 | 5/2003 | Poorman | 242/615.2 |
| 2003/0089819 A1 | 5/2003 | Bloomquist et al. | 242/615.3 |

FOREIGN PATENT DOCUMENTS

| | | | |
|---|---|---|---|
| DE | 38 42 350 | * | 6/1990 |
| DE | 3842350 | | 6/1990 |
| JP | 3-250480 | | 8/1991 |

OTHER PUBLICATIONS

"Capstan Surface Grooves to Improve Tape Guidance", IBM Technical Disclosure Bulletin, vol. 14, No. 3, Aug. 1971, p. 677.

* cited by examiner

*Primary Examiner*—William A. Rivera
(74) *Attorney, Agent, or Firm*—John H. Holcombe (57) ABSTRACT

A tape path roller guide has a cylindrical guiding surface between two flanges. A plurality of continuous venting valleys in the guiding surface are wholly parallel to a central axis of the cylinder forming axial paddle-like surfaces generating air flow away from the cylindrical guiding surface tending to draw air from the guiding surface. Thus, a tape is allowed to stay in contact with the guiding surface. Because of the continuous venting valleys, the roller cylinder is made by molding or extrusion.

15 Claims, 6 Drawing Sheets

TAPE PATH ROLLER GUIDE AND METHOD FOR MAKING

CROSS REFERENCE TO RELATED APPLICATION

The present application is a continuation of U.S. patent application Ser. No. 10/422,186, filed Apr. 23, 2003 now U.S. Pat. No. 6,938,851.

FIELD OF THE INVENTION

This invention relates to tape path roller guides for guiding tape, such as magnetic tape, in a tape path, for example, in a magnetic tape drive, and, more particularly, to providing a tape path roller guide which is capable of operation at high velocities.

BACKGROUND OF THE INVENTION

Magnetic tape is mounted on tape reels with one or more read/write heads of a tape drive positioned adjacent a length of the magnetic tape. The magnetic tape is either provided with one tape reel and threaded to a second tape reel in the tape drive, or is mounted on two tape reels in a cartridge. The magnetic tape is moved longitudinally, typically at a high speed, between the tape reels, to access desired data on the magnetic tape, and then moved at a lower speed to read and/or write data with respect to the magnetic tape.

Lowering the time to access data on a magnetic tape is typically considered important, and is often countered by having more data on the magnetic tape by making the magnetic tape longer. One solution is to move the magnetic tape longitudinally at ever higher velocities. In magnetic tape drives, the tape is typically guided in the lateral direction to provide an alignment with respect to the read/write head(s). Tape path guides provide such lateral guiding.

One type of tape path guide is a fixed guide, which may comprise ceramic or metal guides on either side of the tape path. At high tape velocities, the magnetic tape tends to abrade and cut into the guides, reducing their effective life, and may distort or otherwise damage the magnetic tape. The fixed guide typically also comprises a fixed surface over which the tape slides, which generates friction with the tape and tends to distort and stretch the tape, and, as such, is not usable for high velocities. Rather, such tape guides employ air bearings to allow the tape to ride on a cushion of air. However, air bearings require air pressure pumps and plumbing, resulting in inefficient use of space and resulting in extra cost.

Another type of tape path guide is a tape path roller guide which is a roller with flanges on either side of the tape path. Smooth tape path roller guides tend to float the magnetic tape, causing it to slide. Hence, many tape path roller guides are provided with grooves that extend circumferentially with respect to the roller, or have a circumferential aspect, so that air that would otherwise be trapped under the magnetic tape as the magnetic tape is brought into contact with the roller, is allowed to move into the groove and moves circumferentially along the groove away from the point of contact, and is bled off. However, at high tape velocities and high roller velocities, the friction between the air and the magnetic tape, and between the air and the roller surface, is too great, such that the air becomes trapped and the magnetic tape is partially or entirely floated off the roller, causing the magnetic tape to slide on the surface of the roller. This leads to abrasion of both the magnetic tape and the roller, and to distortion of the magnetic tape. Increasing the tension on the magnetic tape to counteract the effect may cause the tape to stretch and distort.

Additionally, if the grooves are entirely circumferential, the edges between the grooves and surface of the roller tend to mishape the tape and to cut into and distort the magnetic tape. If the grooves are partially circumferential, such as helical or crosshatched, the grooves tend to move the tape from one side of the roller to the other, dependent on the variations in tension on the magnetic tape.

Further, the grooves must be machined. If the grooves are helical or crosshatched, they cannot be molded, since the release of the mold would cause undercuts to the roller. If the grooves are entirely circumferential, the witness line, or mold separation line, would have to be axial to prevent undercuts, resulting in the need to machine the entire surface to insure roundness. Hence, the grooves of roller guides are typically machined.

SUMMARY OF THE INVENTION

The present invention comprises a tape path roller guide with a roller cylinder having a cylindrical guiding surface between the two tape guide flanges, the cylindrical guiding surface having a central axis. The roller cylinder has a plurality of continuous venting valleys in the cylindrical guiding surface which are wholly parallel to the central axis, forming axial paddle-like surfaces. The friction between the paddle-like surfaces and air, as the tape path roller guide is rotated, tends to move the air away from the cylindrical guiding surface, creating a lower pressure. Thus, the tape is allowed to stay in contact with the cylindrical guiding surface of the tape path roller guide.

In one embodiment of the present invention, the roller cylinder comprises a cylindrical surface greater in the direction of the central axis than the cylindrical guiding surface, the cylindrical surface having the plurality of continuous venting valleys, and at least one tape guide flange mounted to the cylindrical surface, forming the cylindrical guiding surface between the two tape guide flanges.

As examples, the tape guide flange comprises a cylindrical opening which is piloted on or press fitted to the roller cylinder cylindrical surface.

As an alternative embodiment, the tape guide flange(s) are positioned at the ends of the roller cylinder.

In a still further embodiment of the present invention, with the continuous venting valleys in the cylindrical guiding surface wholly parallel to the central axis, the roller cylinder is molded in a mold, shaping the cylindrical guiding surface. The mold has a circumferential witness line axially displaced from the cylindrical guiding surface, and the roller cylinder is axially released from the mold. At least one tape guide flange is mounted to the roller cylinder, forming the cylindrical guiding surface between the two tape guide flanges, and the continuous venting valleys extend beyond the cylindrical guiding surface and by the at least one tape guide flange, venting the cylindrical guiding surface to the exterior of the at least one tape guide flange.

In one embodiment, the molded roller cylinder comprises an injection molded plastic. In another embodiment, the molded roller cylinder comprises a dry press ceramic. In a further embodiment, the molded roller cylinder comprises a pressed powder metal.

In still another embodiment, the plurality of continuous venting valleys comprise "V"-shaped grooves, or alternatively, radiused grooves, the sides of the grooves forming the paddle-like surfaces.

In one embodiment, with the continuous venting valleys in the cylindrical guiding surface wholly parallel to the central axis, the roller cylinder comprises an extruded part. In one example, the roller cylinder comprises a plastic material.

In a further embodiment, the continuous venting valleys extend beyond the cylindrical guiding surface and by at least one of the tape guide flanges, venting the cylindrical guiding surface to the exterior of the tape guide flange.

In a still further embodiment, a venting opening is provided at at least one end of the cylindrical guiding surface, and the continuous venting valleys extend to the venting opening, venting the cylindrical guiding surface.

For a fuller understanding of the present invention, reference should be made to the following detailed description taken in conjunction with the accompanying drawings.

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

FIGS. 1, 2, 3 and 4 illustrate an embodiment of a tape path roller guide 10 in accordance with the present invention, with two tape guide flanges 12 and 14. A roller cylinder 15 has a cylindrical guiding surface 16 between the two tape guide flanges, the cylindrical guiding surface having a central axis 17. The cylindrical guiding surface 16 is substantially the width of a magnetic tape in order to guide the tape.

The roller cylinder 15 has a plurality of venting valleys 20 in the cylindrical guiding surface 16 which are wholly parallel to the central axis 17, and exhibit no circumferential aspect.

The venting valleys 20 form axial paddle-like surfaces 21. As the tape path roller guide 10 is rotated, the friction between the paddle-like surfaces 21 and air tends to move the air away from the cylindrical guiding surface 16, thereby generating air flow away from the cylindrical guiding surface to draw air from the cylindrical guiding surface 16 and venting valleys 20, generating a lower air pressure. Thus, the tape is allowed to stay in contact with the cylindrical guiding surface of the tape path roller guide.

Figure 1:
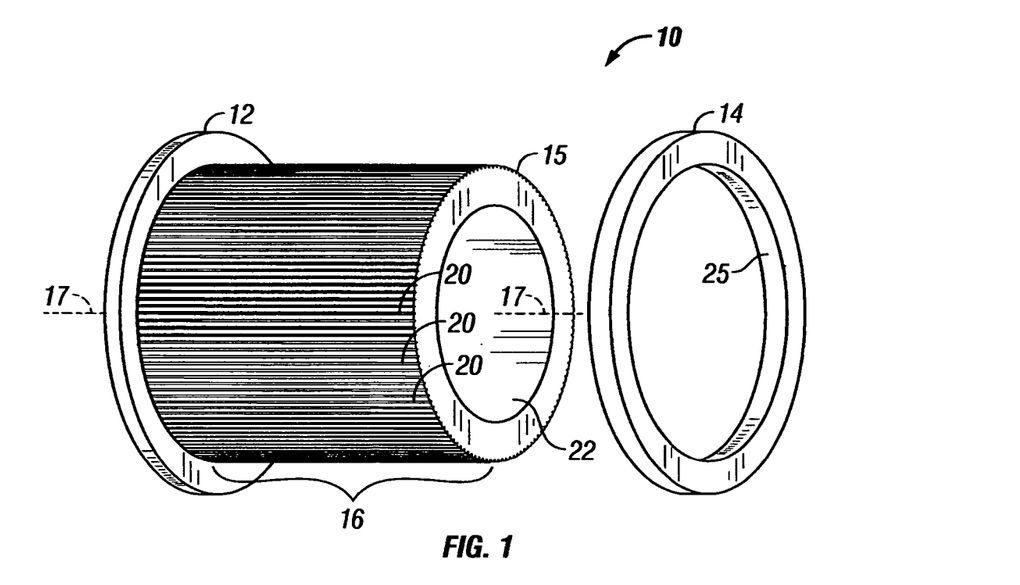
FIG. 1 is an isometric illustration of an embodiment of a tape path roller guide of the present invention with one tape guide flange on a roller cylinder, and another tape guide flange positioned to be mounted on the roller cylinder.
Figure 2:
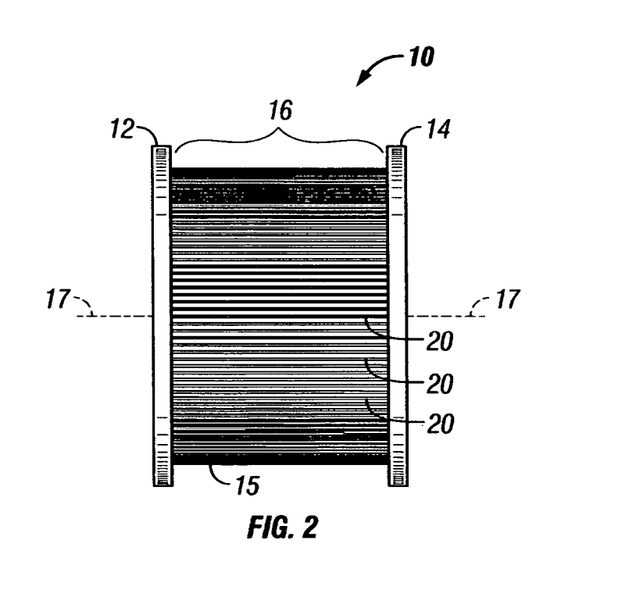
FIG. 2 is a front view of an assembled tape path roller guide of FIG. 1.
Figure 3:
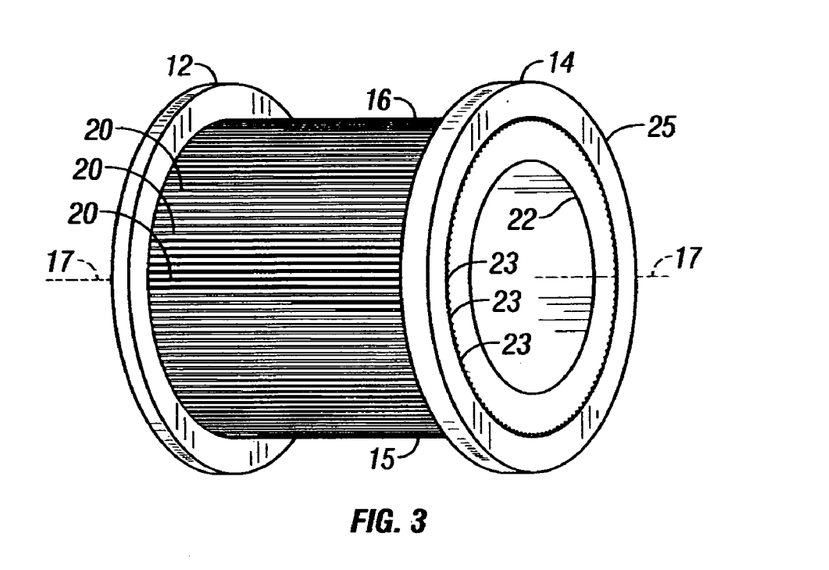
FIG. 3 is an isometric illustration of an assembled tape path roller guide of FIG. 1.

In the embodiment of FIGS. 1, 2 and 3, the roller cylinder 15 comprises a cylindrical surface greater in the direction of the central axis 17 than the cylindrical guiding surface 16, the cylindrical surface having the plurality of continuous venting valleys 20, and the tape guide flange 14 is mounted to the cylindrical surface, forming the cylindrical guiding surface between the two tape guide flanges. This allows the roller cylinder 15 to be molded or extruded, as will be discussed.

Alternatively, the surface and tape guide flange 14 are not cylindrical, but are tapered or inset toward the central axis 17, as are the continuous venting valleys 20.

Still alternatively, both sides of the roller cylinder 15 comprise a cylindrical surface, and both tape guide flanges 12 and 14 are mounted on the roller cylinder cylindrical surface. As such, the continuous venting valleys extend beyond the cylindrical guiding surface 16, and by both of the tape guide flanges 12 and 14. As discussed above, the friction between the paddle-like surfaces 21 and air, as the tape path roller guide 10 is rotated, tends to move the air away from the cylindrical guiding surface 16 and venting valleys 20, creating a lower pressure. Thus, the tape is allowed to stay in contact with the cylindrical guiding surface of the tape path roller guide.

The tape path roller guide 10 may be provided with an interior opening 22 for mounting the roller guide on a roller bearing for rotation.

As one example of mounting the tape guide flanges 12 and/or 14 to the roller cylinder 15, the tape guide flange, e.g., tape guide flange 14, comprises a cylindrical opening 25 which is piloted on or press fitted to the roller cylinder cylindrical surface 16, and the plurality of continuous venting valleys 20 extend through the cylindrical opening of the tape guide flange.

In one embodiment of the present invention, the continuous venting valleys 20 extend beyond the cylindrical guiding surface 16 between the tape guide flanges, and extend by at least one of the tape guide flanges to form openings 23 at the exterior of the tape guide flange 14, venting the cylindrical guiding surface to the exterior of tape guide flange 14.

Figure 4:
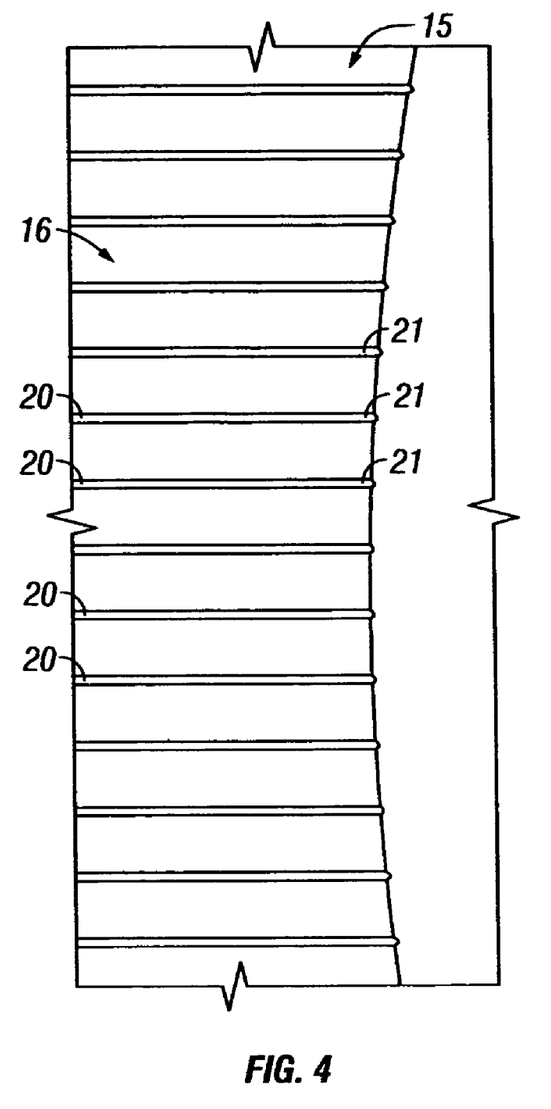
FIG. 4 is a cut-away isometric illustration of a portion of the roller cylinder of FIG. 1, illustrating the venting valleys.
Figure 5:
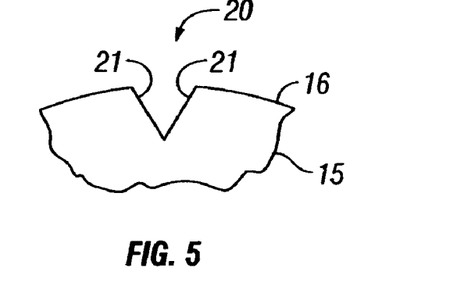
FIG. 5 is a cut-away end view of the roller cylinder of FIG. 1, illustrating the venting valleys and paddle-like surfaces.
Figure 6:
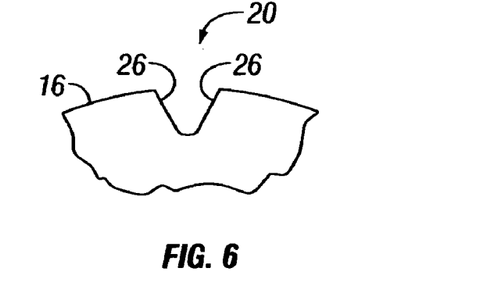
FIG. 6 is a cut-away end view of an alternative embodiment of the roller cylinder of FIG. 1, illustrating the venting valleys and paddle-like surfaces.

FIGS. 4 and 5 illustrate the continuous venting valleys 20 and paddle-like surfaces 21, e.g., of the cylindrical guiding surface 16 of the roller cylinder 15. In one embodiment, the plurality of continuous venting valleys 20 comprise "V"-shaped grooves forming the paddle-like surfaces 21. In another embodiment such as illustrated in FIG. 6, the continuous venting valleys 20 of cylindrical guiding surface 16 comprise radiused grooves forming paddle-like surfaces 26.

Figure 7:
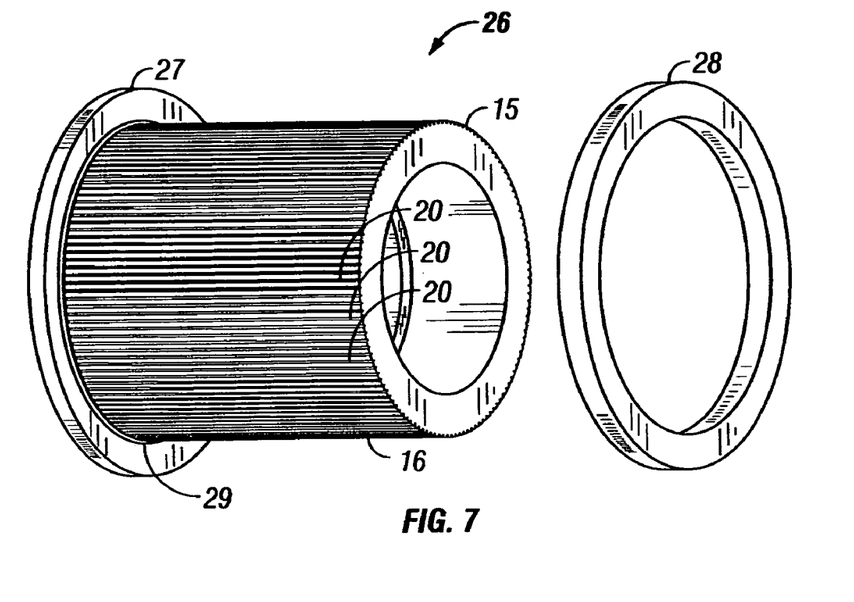
FIG. 7 is an isometric illustration of a further alternative embodiment of a tape path roller guide of the present invention with one tape guide flange on a roller cylinder, and another tape guide flange to be positioned at the roller cylinder.
Figure 8:
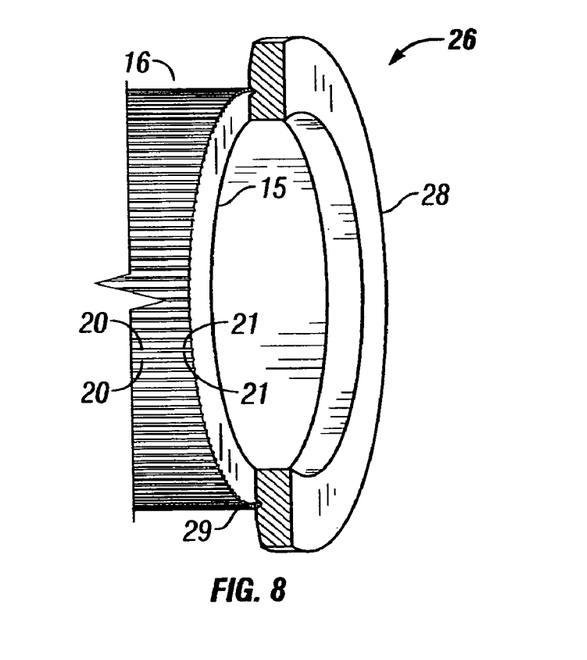
FIG. 8 is a cut-away isometric illustration of a tape guide flange positioned at the roller cylinder of FIG. 7.

FIGS. 7 and 8 illustrate an alternative embodiment of a tape path roller guide 26 having a roller cylinder 15 with a cylindrical guiding surface 16 and a plurality of venting valleys 20 with paddle-like surfaces 21 as above, but where at least one of two tape guide flanges 27 and 28 is positioned at an end of the roller cylinder 15. In one embodiment, the tape guide flange or flanges, e.g., tape guide flange 28, is cemented to the roller cylinder 15. In another embodiment, both the tape guide flange 28 and roller cylinder 15 are mounted on a roller bearing and urged together by spring pressure. Those of skill in the art can envision further means for positioning tape guide flanges 12, 14, 27, 28 with roller cylinder 15 for rotation. Still alternatively, the tape guide flanges 27, 28 may be fixed, while the roller cylinder 15 is mounted for rotation.

Still referring to FIGS. 7 and 8, in one embodiment of the present invention, a venting opening 29 is provided at the end(s) of the cylindrical guiding surface 16, such that the continuous venting valleys 20 extend to the venting opening 29, thereby venting the cylindrical guiding surface.

Figure 9:
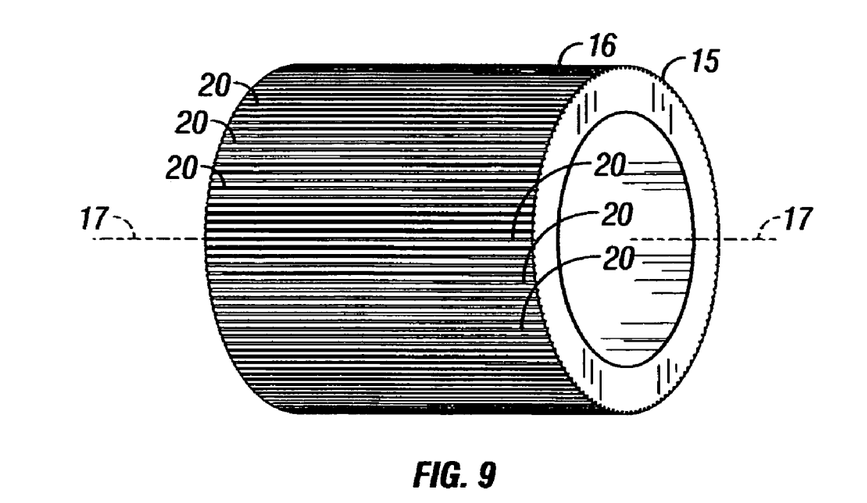
FIG. 9 is an isometric illustration of the roller cylinder of FIG. 1 or of FIG. 7 without tape guide flanges.

FIG. 9 illustrates an embodiment of the roller cylinder 15 without the presence of the tape guide flanges. As discussed above, the roller cylinder 15 has a plurality of continuous venting valleys 20 in the cylindrical guiding surface 16 which are wholly parallel to the central axis 17, and which exhibit no circumferential aspect.

Figure 10:
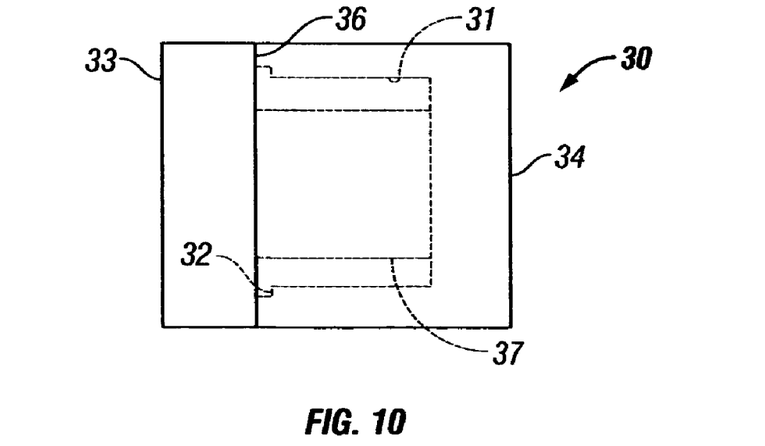
FIG. 10 is a plan view of a mold for molding a roller cylinder and one flange of the tape path roller guide of FIG. 1 or of FIG. 7.

Referring to FIGS. 1, 7 and 10, in one embodiment of the present invention, with continuous venting valleys 20 and paddle-like surfaces in the cylindrical guiding surface 16 wholly parallel to the central axis, the roller cylinder is molded in a mold 30, the mold interior 31 shaping the cylindrical guiding surface with the continuous venting valleys. In the example of FIGS. 1 and 6, the mold 30 additionally comprises a mold 32 for one of the tape guide flanges. In this instance, mold 30 additionally comprises a center section 37 for forming the opening 22 for mounting the roller cylinder 15 to a roller bearing. The mold 30 has at least two parts 33 and 34, and a circumferential witness line 36, axially displaced from the cylindrical guiding surface 16, joins the two parts. "Axially displaced" means that the circumferential witness line 36 is at or near the edge of the cylindrical surface, and is not on the surface 16 which would be touched by the tape. When the part has been molded, the part comprising the roller cylinder 15 and tape guide flange 12, with continuous venting valleys, is axially released from the mold out of mold part 34.

Figure 11:
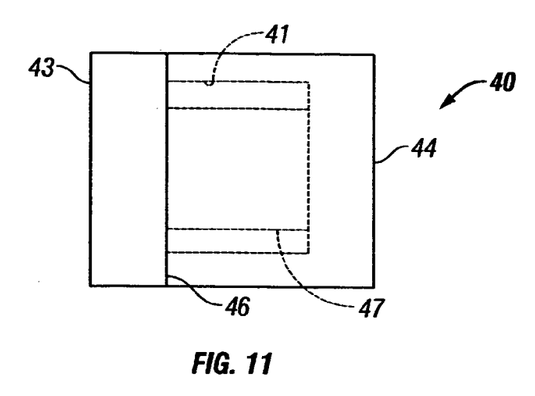
FIG. 11 is a plan view of a mold for molding the roller cylinder of FIG. 1 or of FIG. 7.

Referring to FIGS. 9 and 11, in one embodiment of the present invention, with continuous venting valleys 20 in the cylindrical guiding surface 16 wholly parallel to the central axis 17, the roller cylinder is molded in a mold 40, the mold interior 41 shaping the cylindrical guiding surface with the continuous venting valleys. In the example of FIGS. 9 and 11, the mold 30 is for the roller cylinder 15 only, without a tape guide flange. In this instance, the continuous venting valleys extend the full length of the roller cylinder 15. The mold may also have a center section 47 to form a surface for mounting the roller cylinder to a roller bearing. The mold 40 has at least two parts 43 and 44, and a circumferential witness line 46 axially displaced from the cylindrical guiding surface joins the two parts. When the part has been molded, the part comprising the roller cylinder 15, with continuous venting valleys 20, is axially released from the mold out of mold part 44.

In either mold 30 or mold 40, the end of the mold 34, 44 may be tapered or inset toward the central axis, to taper or inset the cylindrical surface 16 at one end of the roller cylinder 15. The taper or inset is beyond the actual cylindrical guiding surface 16 between the tape guide flanges. In one embodiment, the continuous venting valleys 20 also conform to the taper or inset to form openings at the exterior of the tape guide flange, venting the cylindrical guiding surface to the exterior of the tape guide flange.

In another embodiment, the roller cylinder 15 is extruded from an extruder having the shape of the interior cylindrical portion 41 of the mold 40, the extruder shaping the cylindrical guiding surface with the continuous venting valleys. When extruded, neither end of the roller cylinder is tapered or inset.

Figure 12:
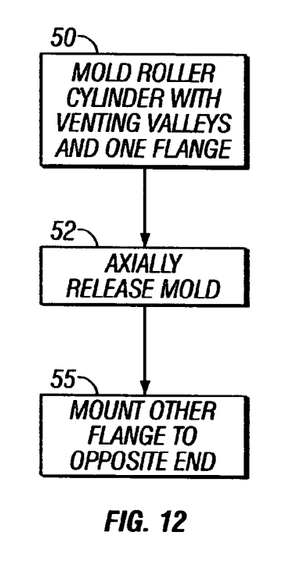
FIG. 12 is a flow chart depicting an embodiment of the present invention for molding a roller cylinder and one flange employing the mold of FIG. 10.

FIG. 12 comprises an embodiment of a method for making the tape path roller guide 10 of FIGS. 1 and 7 which is made with one tape guide flange 12, 27 molded with the roller cylinder 15.

Referring to FIGS. 1, 7, 10 and 12, in step 50, with mold 30 assembled and joined at the circumferential witness line 36, which is axially displaced from the cylindrical guiding surface, the roller cylinder 15 and tape guide flange 12, 27 are molded.

In one embodiment, the molding step 50 comprises injection molding a plastic. In another embodiment, the molding step 50 comprises dry pressing a ceramic. In still another embodiment, the molding step 50 comprises pressing a powdered metal.

Thus, the molded part comprising the roller cylinder 15 and tape guide flange comprises an injection molded plastic. In another embodiment, the molded roller cylinder comprises a dry press ceramic. In a further embodiment, the molded roller cylinder comprises a pressed powder metal.

In step 52, the at least two parts 33 and 34 of mold 30 are separated at the circumferential witness line 36, and the part comprising the roller cylinder 15 and tape guide flange 12, 27 is axially released from the mold out of mold part 34, as allowed by the continuous venting valleys 20.

Then, in optional step 55, a tape guide flange 14, 28 is mounted to, or positioned at, the roller cylinder, forming the cylindrical guiding surface 16 between the two tape guide flanges 12, 14 or 27, 28.

Figure 13:
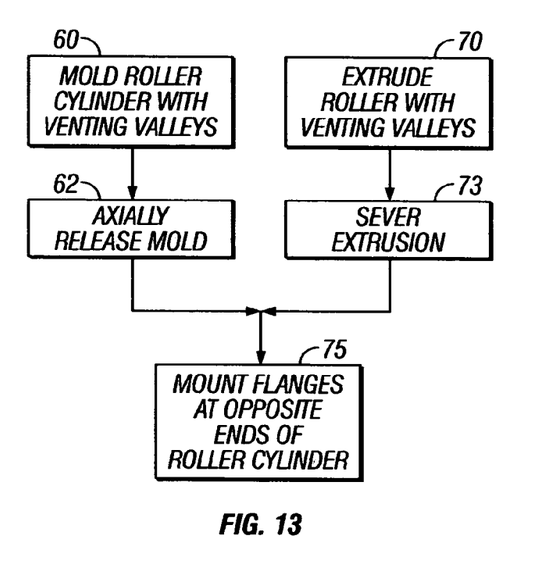
FIG. 13 is a flow chart depicting an embodiment of the present invention for molding a roller cylinder employing the mold of FIG. 11, and for extruding a roller cylinder.

FIG. 13 comprises an embodiment of alternative methods for making the tape path roller guide 10 of FIGS. 1 and 7 which utilizes the roller cylinder 15 without an integral tape guide flange, and to which both tape guide flanges are mounted. The alternative methods comprise molding or extruding the roller cylinder 15.

Referring to FIGS. 1, 7, 9, 11, and 13, in step 60, with mold 40 assembled and joined at the circumferential witness line 46, which is axially displaced from the cylindrical guiding surface, the roller cylinder 15 with continuous venting valleys 20, is molded. As discussed above, in one embodiment, the molding step 60 comprises injection molding a plastic. In another embodiment, the molding step 60 comprises dry pressing a ceramic. In still another embodiment, the molding step 60 comprises pressing a powdered metal.

In step 62, the at least two parts 33 and 34 of mold 30 are separated at the circumferential witness line 36, and the part comprising the roller cylinder 15 is axially released from the mold out of mold part 34.

In the alternative embodiment, in step 70, a roller is extruded in an extruder, shaping a cylindrical surface 16, and a plurality of continuous venting valleys 20 with paddle-like surfaces 21 in the cylindrical surface wholly parallel to the central axis. Then, in step 73, the extruded roller is severed to form a roller cylinder 15. Thus, with the continuous venting valleys in the cylindrical guiding surface wholly parallel to the central axis, the roller cylinder comprises an extruded part. As an example, the extruded part is made of a plastic material, and the extruded part comprising the roller cylinder 15 comprises an extruded plastic.

Then, after the roller cylinder has been formed by molding or extrusion, in optional step 55, tape guide flanges 12 and 14, or 27 and 28, are mounted to the roller cylinder, forming the cylindrical guiding surface 16 between the two tape guide flanges 12, 14, 27, 28.

As discussed above, the tape guide flanges 12 and 14, in one embodiment, each comprises a cylindrical opening 25 which is piloted on, or press fitted to the roller cylinder cylindrical surface 16.

Referring to FIGS. 12 and 13, in an alternative embodiment, step 55 of FIG. 12 and step 75 of FIG. 13 may alternatively comprise cementing the tape guide flanges 12 and/or 14 onto the roller cylinder cylindrical surface 16, or cementing the tape guide flanges 27 and/or 28 to the end(s) of the roller cylinder 15.

Still alternatively, if the molded roller cylinder 15 is tapered or inset at one end, the tape guide flange at that end may be piloted onto that end.

Although only magnetic tape has been discussed, other types of tape systems, such as optical data storage tape, may employ the present invention.

The illustrated components of the tape path roller guides 10 of FIGS. 1 and 7, may be varied, or combined, and the illustrated steps of FIGS. 12 and 13 may be conducted discontinuously, or other steps added, as is known to those of skill in the art.

While the preferred embodiments of the present invention have been illustrated in detail, it should be apparent that modifications and adaptations to those embodiments may occur to one skilled in the art without departing from the scope of the present invention as set forth in the following claims.

We claim:

1. A tape path roller guide configured to guide magnetic tape, comprising:
   a roller cylinder having a cylindrical guiding surface, said cylindrical guiding surface substantially the width of said magnetic tape, said cylindrical guiding surface having a central axis, and
   said roller cylinder having a plurality of continuous venting valleys in said cylindrical guiding surface wholly parallel to said central axis, said continuous venting valleys having axial paddle-like surfaces, said paddle-like surfaces configured to, when said roller cylinder is rotated about said central axis, tend to move air away from said cylindrical guiding surface, and thereby generate air flow away from said cylindrical guiding surface and draw air from said cylindrical guiding surface and said continuous venting valleys.

2. A tape path roller guide configured to guide magnetic tape, comprising:
   a roller cylinder having a cylindrical guiding surface, said cylindrical guiding surface substantially the width of said magnetic tape, said cylindrical guiding surface having a central axis;
   said roller cylinder having a plurality of continuous venting valleys in said cylindrical guiding surface wholly parallel to said central axis, said continuous venting valleys having axial paddle-like surfaces, said paddle-like surfaces configured to, when said roller cylinder is rotated about said central axis, tend to move air away from said cylindrical guiding surface, and thereby generate air flow away from said cylindrical guiding surface and draw air from said cylindrical guiding surface and said continuous venting valleys; and
   two tape guide flanges at either end of said roller cylinder, forming said cylindrical guiding surface between said two tape guide flanges;
   said plurality of continuous venting valleys extending beyond said cylindrical guiding surface and by at least one of said tape guide flanges, for venting said cylindrical guiding surface to the exterior of said at least one tape guide flange.

3. The tape path roller guide of claim 2, wherein said roller cylinder and tape guide flange comprises a plastic.

4. The tape path roller guide of claim 2, wherein said roller cylinder and tape guide flange comprises a ceramic.

5. The tape path roller guide of claim 2, wherein said roller cylinder and tape guide flange comprises a powder metal.

6. The tape path roller guide of claim 2, wherein said roller cylinder is tapered toward said central axis beyond said cylindrical guiding surface, at at least one end of said cylindrical guiding surface.

7. The tape path roller guide of claim 2, where in said roller cylinder is inset toward said central axis beyond said cylindrical guiding surface, at least one end of said cylindrical guiding surface.

8. A tape path roller guide configured to guide magnetic tape, comprising:
   a roller cylinder having a cylindrical guiding surface, said cylindrical guiding surface substantially the width of said magnetic tape, said cylindrical guiding surface having a central axis;
   said roller cylinder having a plurality of continuous venting valleys in said cylindrical guiding surface wholly parallel to said central axis, said continuous venting valleys having axial paddle-like surfaces, said paddle-like surfaces configured to, when said roller cylinder is rotated about said central axis, tend to move air away from said cylindrical guiding surface, and thereby generate air flow away from said cylindrical guiding surface and draw air from said cylindrical guiding surface and said continuous venting valleys; and
   two tape guide flanges at either end of said roller cylinder, forming said cylindrical guiding surface between said two tape guide flanges; and
   additionally comprising a venting opening at at least one end of said cylindrical guiding surface, and wherein said continuous venting valleys extend to said venting opening, for venting said cylindrical guiding surface.

9. The tape path roller guide of claim 8, wherein said plurality of continuous venting valleys comprise "V"-shaped grooves.

10. The tape path roller guide of claim 8, wherein said plurality of continuous venting valleys comprise radiused grooves.

11. The tape path roller guide of claim 8, wherein said roller cylinder comprises an extruded part.

12. The tape path roller guide of claim 8, wherein said roller cylinder comprises a molded part.

13. The tape path roller guide of claim 12, wherein said roller cylinder comprises a plastic.

14. The tape path roller guide of claim 12, wherein said roller cylinder comprises a ceramic.

15. The tape path roller guide of claim 12, wherein said roller cylinder comprises a powder metal.

* * * * *